UNITED STATES PATENT OFFICE.

SAMUEL C. HOGUE, OF OSKALOOSA, IOWA.

IMPROVEMENT IN COMPOSITE ROOFING.

Specification forming part of Letters Patent No. 136,722, dated March 11, 1873.

*To all whom it may concern:*

Be it known that I, SAMUEL C. HOGUE, of Oskaloosa, in the county of Mahaska and State of Iowa, have invented a new and valuable Improvement in Composition Roofing; and I do hereby declare that the following is a full, clear, and exact description of the same.

This invention has relation to composition roofing; and it consists in the use of the following materials, combined and applied substantially in the manner and for the purpose hereinafter specified.

The roof is first covered with felt or roofing-paper, and to this is applied a coating made by mixing ten pounds of flour in twenty gallons of water to a mucilage, by the aid of heat, and adding sufficient plaster of Paris to form a thick paste. Upon this coating is spread a layer made by mixing together forty gallons of coal-tar or crude benzine; two gallons of linseed-oil; one-half pound gum-parra, dissolved; four hundred pounds of gypsum or soft stone of any kind; and two gallons of crude glycerine; all to be united by heat and spread over the cement coating before the latter is perfectly dry. A third layer or coating formed by combining three hundred pounds of gypsum or plaster of Paris, twenty gallons of water, ten pounds of flour, and one pound of gum-arabic. The flour and gum-arabic to be made into a paste by heat and water before the plaster is added. This compound is to be spread on the second layer before the latter is hard.

What I claim as my invention, and desire to secure by Letters Patent, is—

1. The combination of coal-tar or crude benzine, linseed-oil, gum-parra, gypsum or soft stone, and crude glycerine to form a roofing-cement, substantially as specified.

2. The combination of gypsum or plaster of Paris, flour, gum-arabic, substantially as and for the purpose specified.

3. The compound roofing composed of the layers formed in the manner and applied to a roof substantially as described.

In testimony that I claim the above I have hereunto subscribed my name in the presence of two witnesses.

SAMUEL C. HOGUE.

Witnesses:
 RICHARD DUMONT,
 JOHN LARNER.